(12) United States Patent
Williams

(10) Patent No.: US 8,286,004 B2
(45) Date of Patent: Oct. 9, 2012

(54) SAVING ENCRYPTION KEYS IN ONE-TIME PROGRAMMABLE MEMORY

(75) Inventor: Jeffrey L. Williams, Rochester, MN (US)

(73) Assignee: LSI Corporation, Milpitas, CA (US)

( * ) Notice: Subject to any disclaimer, the term of this patent is extended or adjusted under 35 U.S.C. 154(b) by 345 days.

(21) Appl. No.: 12/767,985

(22) Filed: Apr. 27, 2010

(65) Prior Publication Data

US 2011/0087898 A1  Apr. 14, 2011

Related U.S. Application Data

(60) Provisional application No. 61/250,055, filed on Oct. 9, 2009, provisional application No. 61/250,047, filed on Oct. 9, 2009, provisional application No. 61/265,109, filed on Nov. 30, 2009.

(51) Int. Cl.
*G06F 11/30* (2006.01)
(52) U.S. Cl. ........................................... 713/193
(58) Field of Classification Search .................. 713/162, 713/164, 165, 189, 190, 193; 380/44, 46, 380/278
See application file for complete search history.

(56) References Cited

U.S. PATENT DOCUMENTS

| | | |
|---|---|---|
| 4,402,046 A | 8/1983 | Cox et al. |
| 5,121,480 A | 6/1992 | Bonke et al. |
| 5,297,029 A | 3/1994 | Nakai |
| 5,353,410 A | 10/1994 | Macon et al. |
| 5,732,409 A | 3/1998 | Ni |
| 5,734,821 A | 3/1998 | Chung et al. |
| 5,974,502 A | 10/1999 | DeKoning et al. |
| 6,049,838 A | 4/2000 | Miller et al. |
| 6,081,849 A | 6/2000 | Born et al. |
| 6,145,072 A | 11/2000 | Shams et al. |
| 6,158,004 A | 12/2000 | Mason et al. |
| 6,212,617 B1 | 4/2001 | Hardwick |
| 6,247,040 B1 | 6/2001 | Born et al. |
| 6,324,594 B1 | 11/2001 | Ellis et al. |
| 6,363,470 B1 | 3/2002 | Laurenti et al. |
| 6,385,683 B1 | 5/2002 | DeKoning et al. |
| 6,449,666 B2 | 9/2002 | Noeldner et al. |
| 6,490,635 B1 | 12/2002 | Holmes |
| 6,567,094 B1 | 5/2003 | Curry et al. |
| 6,633,942 B1 | 10/2003 | Balasubramanian |
| 6,678,785 B2 | 1/2004 | Lasser et al. |
| 6,725,329 B1 | 4/2004 | Ng et al. |
| 6,751,680 B2 | 6/2004 | Langerman et al. |

(Continued)

OTHER PUBLICATIONS

TCG Core Architecture Specification, Version 2.0, (2009), Trusted Computing Group, USA.

(Continued)

*Primary Examiner* — Beemnet Dada

(57) ABSTRACT

Described embodiments provide encryption/decryption of data transferred between a media controller and a storage device. The media controller provides encryption/decryption based on a root key (RK). Storage in a one-time programmable (OTP) memory is provided as a plurality of un-burned slots. The OTP memory is initially provided without the RK, which is generated with a random number generator. A control module performs the steps of i) burning the RK to an initial slot of the OTP memory, and ii) validating the burned RK (bRK) stored at the initial slot based on a comparison of the RK and the burned RK. If the control module validates the burned RK, the burned RK is employed by the media controller. Otherwise, one or more subsequent slots of the OTP memory are burned with the RK until the control module validates the corresponding burned RK.

13 Claims, 11 Drawing Sheets

U.S. PATENT DOCUMENTS

| | | |
|---|---|---|
| 7,069,559 B2 | 6/2006 | Janssen et al. |
| 7,286,549 B2 | 10/2007 | Gaur |
| 7,290,066 B2 | 10/2007 | Voorhees et al. |
| 7,408,834 B2 | 8/2008 | Conley et al. |
| 7,461,183 B2 | 12/2008 | Ellis et al. |
| 7,472,331 B2 | 12/2008 | Kim |
| 7,512,847 B2 | 3/2009 | Bychkov et al. |
| 7,590,803 B2 | 9/2009 | Wintergerst |
| 7,650,449 B2 | 1/2010 | Lu |
| 7,650,509 B1 | 1/2010 | Dunning |
| 7,653,778 B2 | 1/2010 | Merry et al. |
| 7,886,155 B2 | 2/2011 | Fiske |
| 7,925,847 B2 | 4/2011 | Ellis et al. |
| 2003/0051078 A1 | 3/2003 | Yoshitake |
| 2003/0110325 A1 | 6/2003 | Roach et al. |
| 2003/0167395 A1 | 9/2003 | Chang et al. |
| 2004/0044873 A1 | 3/2004 | Wong et al. |
| 2004/0123127 A1 | 6/2004 | Teicher et al. |
| 2004/0177212 A1 | 9/2004 | Chang et al. |
| 2005/0114729 A1 | 5/2005 | Nielsen et al. |
| 2005/0144516 A1 | 6/2005 | Gonzalez et al. |
| 2005/0203988 A1 | 9/2005 | Nollet et al. |
| 2006/0050693 A1 | 3/2006 | Bury et al. |
| 2006/0095611 A1 | 5/2006 | Winchester et al. |
| 2006/0123259 A1 | 6/2006 | Yokota et al. |
| 2006/0198515 A1* | 9/2006 | Forehand et al. ............... 380/28 |
| 2007/0028040 A1 | 2/2007 | Sinclair |
| 2007/0109856 A1 | 5/2007 | Pellicone et al. |
| 2007/0255889 A1 | 11/2007 | Yogev et al. |
| 2007/0266200 A1 | 11/2007 | Gorobets et al. |
| 2008/0034153 A1 | 2/2008 | Lee et al. |
| 2008/0052446 A1 | 2/2008 | Lasser et al. |
| 2008/0072071 A1* | 3/2008 | Forehand et al. ............. 713/193 |
| 2008/0082726 A1 | 4/2008 | Elhamias |
| 2008/0120456 A1 | 5/2008 | Lee et al. |
| 2008/0140916 A1 | 6/2008 | Oh et al. |
| 2008/0155145 A1 | 6/2008 | Stenfort |
| 2008/0162079 A1 | 7/2008 | Astigarraga et al. |
| 2008/0224924 A1 | 9/2008 | Lethbridge |
| 2008/0263307 A1 | 10/2008 | Adachi |
| 2008/0279205 A1 | 11/2008 | Sgouros et al. |
| 2009/0138663 A1 | 5/2009 | Lee et al. |
| 2009/0172308 A1 | 7/2009 | Prins et al. |
| 2009/0271562 A1 | 10/2009 | Sinclair |
| 2009/0271796 A1 | 10/2009 | Kojima |
| 2009/0282301 A1 | 11/2009 | Flynn et al. |
| 2009/0285228 A1 | 11/2009 | Bagepalli et al. |
| 2009/0287859 A1 | 11/2009 | Bond et al. |
| 2009/0300277 A1 | 12/2009 | Jeddeloh |
| 2009/0313444 A1 | 12/2009 | Nakamura |
| 2010/0011260 A1 | 1/2010 | Nagadomi et al. |
| 2010/0023800 A1 | 1/2010 | Harari et al. |
| 2010/0122148 A1 | 5/2010 | Flynn et al. |
| 2010/0325317 A1 | 12/2010 | Kimelman et al. |
| 2011/0041039 A1 | 2/2011 | Harari et al. |
| 2011/0047376 A1* | 2/2011 | Mittal ........................... 713/164 |
| 2011/0055458 A1 | 3/2011 | Kuehne |
| 2011/0099355 A1 | 4/2011 | Tran |
| 2012/0069995 A1* | 3/2012 | Matthews, Jr. .................. 380/44 |

OTHER PUBLICATIONS

TCG Storage Interface Interactions Specification, Version 1.0 (2009), Trusted Computing Group, USA.

TCG Storage SSC: Enterprise, Version 1.0, (2009), Trusted Computing Group, USA.

TCG Storage SSC: Opal, Version 1.0, (2009), Trusted Computing Group, USA.

Specification for the Advanced Encryption Standard (AES), Federal Information Processing Standard (FIPS) Publication 197, (2001).

Specification for the Secure Hash Standard (SHS), FIPS Publication 180-3 (2008), National Institute of Standards and Technology (NIST), USA.

Sun et al; "On the Use of Strong BCH Codes for Improving Multi-level NAND Flash Memory Storage Capacity"; ECSE Department, Renssaelaer Polytechnic Institute, Aug. 2006, USA.

Micron Technology, Inc. "NAND Flash 101: An Introduction to NAND Flash and How to Design it into your next product"; TN-29-19; 2006; pp. 1-28; Micron Technology, Inc. Boise Idaho, USA.

Kang et al., "A Superblock-based Flash Translation Layer for NAND Flash Memory"; Computer Science Division: Korea Advanced Institute of Science and Technology (KAIST); EMSOFT '06 Seoul, Korea; pp. 161-170, Published by ACM, NY, NY USA.

Birrell et al., "A Design for High-Performance Flash Disks", ACM SIGOPS Operating Systems Review, vol. 41, Issue 2, pp. 88-93, Apr. 2007.

* cited by examiner

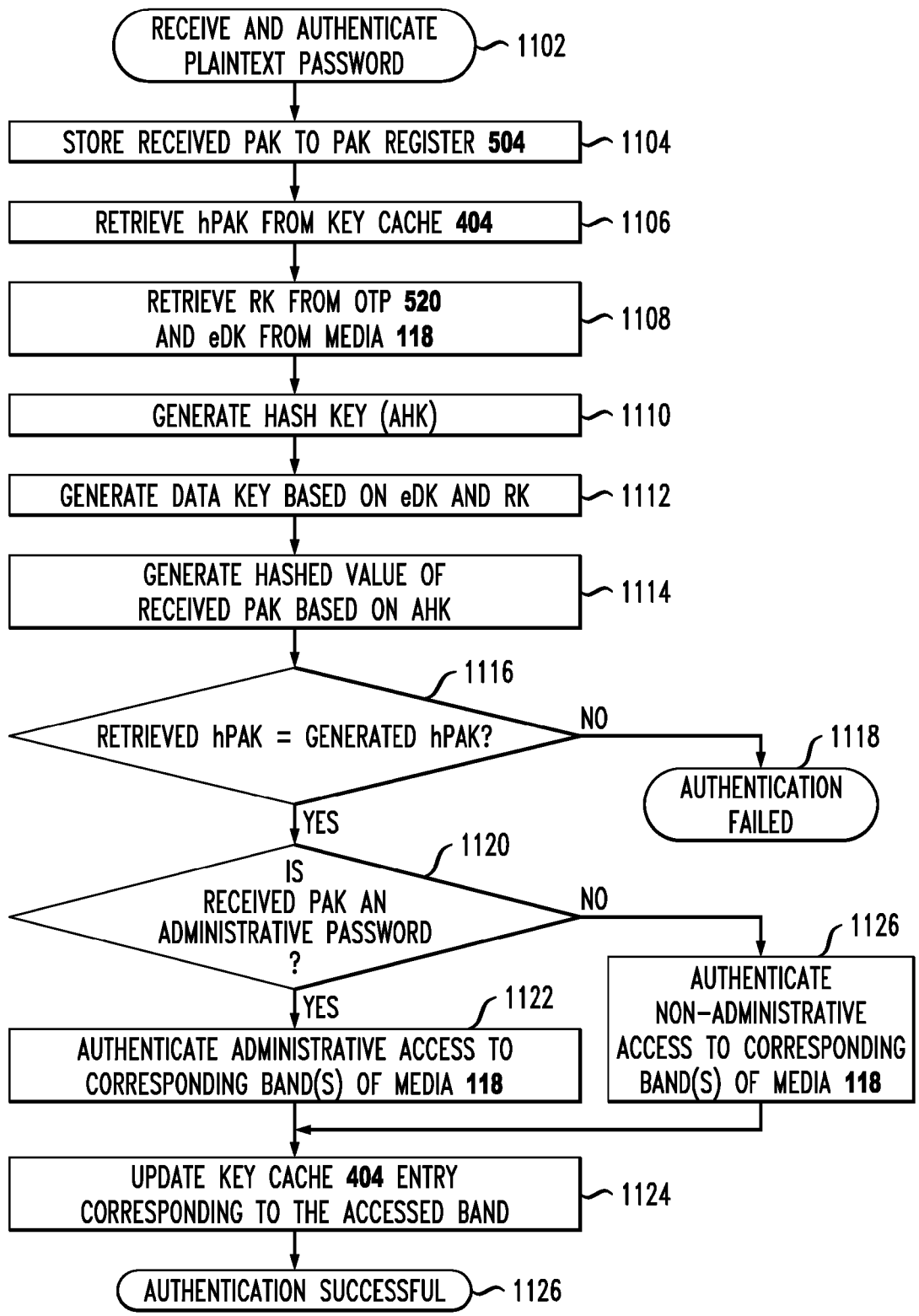

SAVING ENCRYPTION KEYS IN ONE-TIME PROGRAMMABLE MEMORY

CROSS-REFERENCE TO RELATED APPLICATIONS

This application claims the benefit of the filing date of U.S. provisional application Nos. 61/250,055 filed Oct. 9, 2009, 61/250,047 filed Oct. 9, 2009, and 61/265,109 filed Nov. 30, 2009, the teachings of which are incorporated herein in their entireties by reference.

The subject matter of this application is related to U.S. patent application Ser. Nos. 12/436,227 filed May 6, 2009, 12/475,710 filed Jun. 1, 2009, 12/475,716 filed Jun. 1, 2009, 12/477,996 filed Jun. 4, 2009, 12/478,013 filed Jun. 4, 2009, 12/508,879 filed Jul. 24, 2009, 12/508,915 filed Jul. 24, 2009, 12/643,471 filed Dec. 21, 2009, 12/649,490 filed Dec. 30, 2009, 12/722,828 filed Mar. 12, 2010, 12/730,627 filed Mar. 24, 2010, 12/731,631 filed Mar. 25, 2010 and 12/768,058 filed Apr. 27, 2010, the teachings of all of which are incorporated herein in their entireties by reference.

BACKGROUND OF THE INVENTION

1. Field of the Invention

The present invention relates to storage devices, and, in particular, to prevention of unauthorized access to data stored on the storage device with interlocking plaintext passwords for data encryption keys.

2. Description of the Related Art

Flash memory is a type of non-volatile memory that is electrically erasable and re-programmable. Flash memory is primarily used in memory cards and USB flash drives for general storage and transfer of data between computers and other digital products. Flash memory is a specific type of electrically erasable programmable read-only memory (EEPROM) that is programmed and erased in large blocks. One commonly employed type of flash memory technology is NAND flash memory. NAND flash memory forms the core of the flash memory available today, especially for removable universal serial bus (USB) storage devices known as USB flash drives, as well as most memory cards. NAND flash memory exhibits fast erase and write times, requires small chip area per cell, and has high endurance. However, the I/O interface of NAND flash memory does not provide full address and data bus capability and, thus, generally does not allow random access to memory locations.

There are three basic operations for NAND devices: read, write and erase. The read and write operations are performed on a page by page basis. Page sizes are generally $2^N$ bytes, where N is an integer, with typical page sizes of, for example, 2,048 bytes (2 kb), 4,096 bytes (4 kb), 8,192 bytes (8 kb) or more per page. Pages are typically arranged in blocks, and an erase operation is performed on a block by block basis. Typical block sizes are, for example, 64 or 128 pages per block. Pages must be written sequentially, usually from a low address to a high address. Lower addresses cannot be rewritten until the block is erased.

A hard disk is addressed linearly by logical block address (LBA). A hard disk write operation provides new data to be written to a given LBA. Old data is over-written by new data at the same physical LBA. NAND flash memories are accessed analogously to block devices, such as hard disks. NAND devices address memory linearly by page number. However, each page might generally be written only once since a NAND device requires that a block of data be erased before new data is written to the block. Thus, for a NAND device to write new data to a given LBA, the new data is written to an erased page that is a different physical page than the page previously used for that LBA. Therefore, NAND devices require device driver software, or a separate media controller chip with firmware, to maintain a record of mappings of each LBA to the current page number where its data is stored. This record mapping is typically managed by a flash translation layer (FTL) in software/firmware that might generate a logical-to-physical translation table. The flash translation layer corresponds to the media layer of software and/or firmware controlling a hard disk drive (HDD).

Since a storage device, such as a solid state disk (SSD) or HDD, might be used to store sensitive or private data, a typical media controller chip might employ data encryption to encrypt data on all or part of the storage media. For example, a media controller chip might implement a self-encrypting storage device, such as an SSD or HDD, which locks data, locks the drive, erases data completely, and safely stores security credentials. Such a chip might further be optionally employed in combination with a Trusted Platform Module (TPM) security chip found on many enterprise systems. The media controller might also interact with other security measures, such as smart cards or biometric verification.

The Trusted Computing Group (TCG) is an organization that has published standards for Storage Devices and Storage Interfaces generally, and for Security Subsystem Classes (SSCs) specifically, which define the minimum capabilities of a storage device in a specific "class". For example, *TCG Core Architecture Specification*, Version 2.0, (2009) and *TCG Storage Interface Interactions Specification*, Version 1.0 (2009), define a comprehensive architecture of storage devices and storage device commands, respectively. Further, *TCG Storage SSC: Enterprise*, Version 1.0, (2009) (hereinafter "TCG Enterprise Specification"), defines security requirements and commands for enterprise storage systems. Similarly, *TCG Storage SSC: Opal*, Version 1.0, (2009) (hereinafter "TCG Opal Specification"), defines security requirements and commands for consumer storage systems. These documents are referred to herein collectively as "the TCG Specifications". Devices operating in accordance with the TCG Specifications might employ encryption methodologies such as described in *Specification for the Advanced Encryption Standard (AES)*, Federal Information Processing Standard (FIPS) Publication 197, (2001) and *Specification for the Secure Hash Standard (SHS)*, FIPS Publication 180-3 (2008), both published by the National Institute of Standards and Technology (NIST). In any data encryption scheme, for both enterprise and consumer systems, key storage and management are important security issues, as gaining access to the one or more security keys might allow access to data stored on the storage device.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide encryption/decryption of data transferred between a media controller and a storage device. The media controller provides encryption/decryption based on a root key (RK). Storage in a one-time programmable (OTP) memory is provided as a plurality of un-burned slots. The OTP memory is initially provided without the RK, which is generated with a random number generator. A control module performs the steps of i) burning the RK to an initial slot of the OTP memory, and ii) validating the burned RK (bRK) stored at the initial slot based on a comparison of the RK and the burned RK. If the control module validates the burned RK, the burned RK is employed by the media controller. Otherwise, one or more subsequent slots of the OTP memory are burned with the RK until the control module validates the corresponding burned RK.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 11 shows a flow diagram of a process for authenticating a plaintext password, in accordance with embodiments of the present invention.

DETAILED DESCRIPTION

In accordance with embodiments of the present invention, a media controller for a storage device provides for burning a root key and corresponding checksum to a slot in a one-time programmable (OTP) memory. The root key generally might be programmed at the manufacture time of the storage device, rather than at the manufacture time of the media controller System-on-Chip (SoC). Embodiments of the present invention might also employ the root key and checksum burning as a test of the media controller SoC to detect failed devices (e.g., devices having OTP memory failures).

Table 1 defines a list of acronyms employed throughout this specification as an aid to understanding the described embodiments of the present invention:

TABLE 1

| HDD | Hard Disk Drive | DIF | Data Integrity Field |
|---|---|---|---|
| SSD | Solid State Disk | PWT | Pending Write Table |
| API | Application Programming Interface | ACS | Access Control System |
| SATA | Serial Advanced Technology Attachment | DSE | Data Security Engine |
| SCSI | Small Computer System Interface | MBR | Master Boot Record |
| SAS | Serial Attached SCSI | TCG | Trusted Computing Group |
| SoC | System-on-Chip | SSC | Security Subsystem Classes |
| LLD | Low Level Driver | FIPS | Federal Information Processing Standard |
| LBA | Logical Block Address | PRNG | Pseudo Random Number Generator |
| BAM | Buffer Allocation Module | TRNG | Truly Random Number Generator |
| DMA | Direct Memory Access | AES | Advanced Encryption Standard |
| RX | Receive | ECB | Electronic Code Book |
| TX | Transmit | CBC | Cipher Block Chaining |
| I/O | Input/Output | SHA | Secure Hash Algorithm |
| FIFO | First-In, First-Out | PAK | Password Authentication Key |
| AHB | AMBA High-performance Bus | DK | Data Key |
| CTS | Cipher Text Stealing | eDK | encrypted Data Key |
| OTP | One-Time Programmable | AHK | Authentication Hash Key |
| SP | Security Provider | hPAK | hashed Password Authentication Key |
| FDE | Full Disk Encryption | IV | Initialization Vector |
| | | RK | Root Key |

Figure 1:
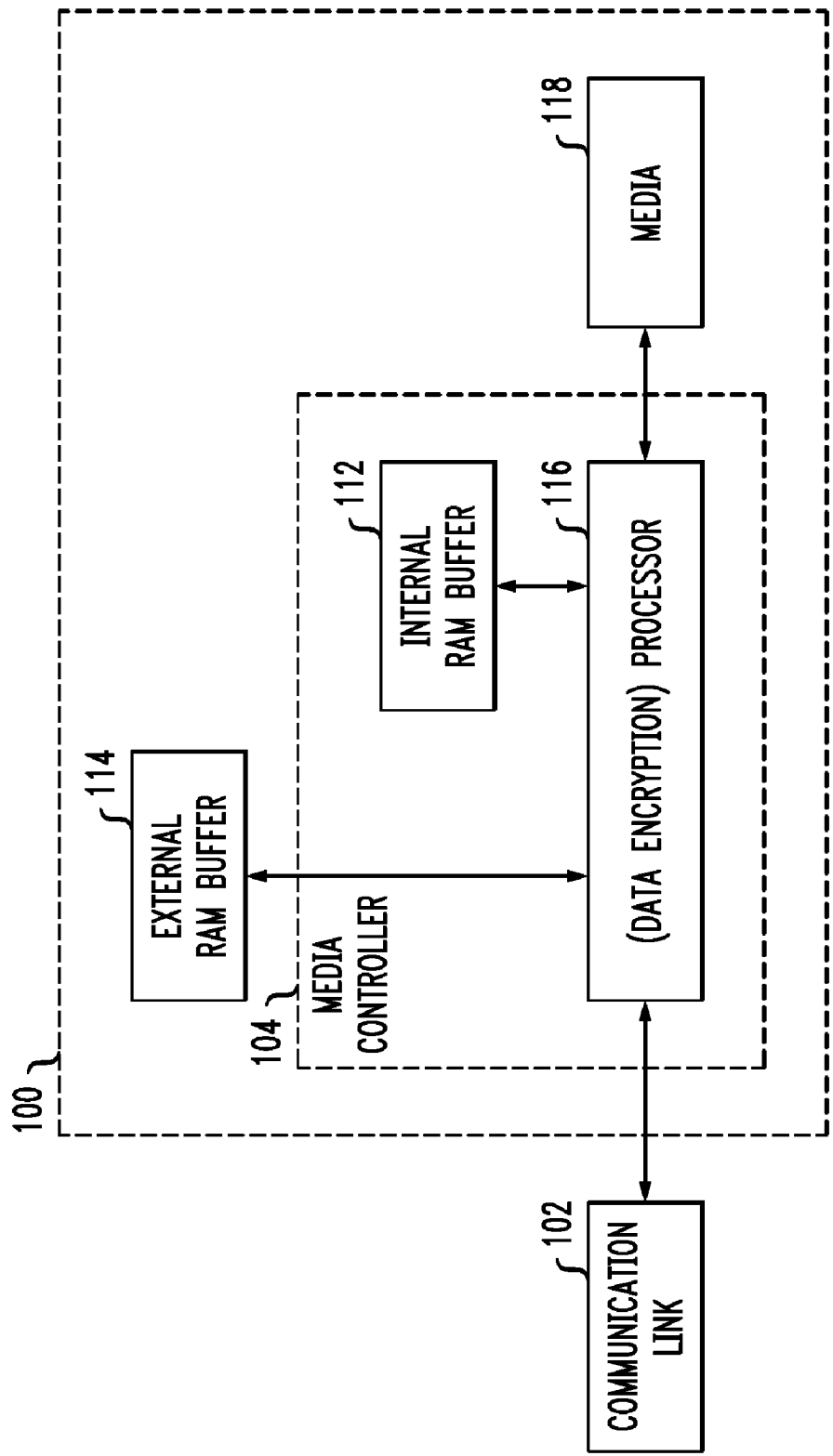
FIG. 1 shows a block diagram of a memory storage system implementing plain text password interlocking with data encryption keys in accordance with exemplary embodiments of the present invention.

FIG. 1 shows a block diagram of storage system 100 implementing plain text password interlocking with data encryption keys in accordance with exemplary embodiments of the present invention. As shown, storage system 100 is electrically coupled to communication link 102. Storage system 100 comprises media controller 104, optional external RAM buffer 114, and storage media 118. Communication link 102 is employed for communication with one or more external devices, such as a computer system or networking device, which interface with storage system 100. Communication link 102 might be a custom-designed communication link, or might conform to a standard communication protocol such as, for example, a Small Computer System Interface ("SCSI") protocol bus, a Serial Attached SCSI ("SAS") protocol bus, a Serial Advanced Technology Attachment ("SATA") protocol bus, a Universal Serial Bus ("USB"), an Ethernet link, an IEEE 802.11 link, an IEEE 802.15 link, and IEEE 802.16 link, or any other similar interface link for connecting a peripheral device to a computer. Storage media 118 might be a direct access block storage device such as, for example, a solid state disk (SSD), a hard disk drive (HDD), or hybrid magnetic and solid state storage system.

Media controller 104 controls transfer of data between media 118 and an external device coupled to communication link 102. Media controller 104 might be implemented as a system-on-chip (SoC). Media controller 104 might include internal RAM buffer 112 and might also be coupled to additional external memory, shown as external RAM buffer 114. In an exemplary embodiment, internal RAM buffer 112 comprises 128 kB of static RAM (SRAM) and external RAM buffer 114 comprises 512 MB of double data rate version 2 dynamic RAM (DDR2 DRAM). RAM buffer 112 might act as a cache for processor 116, while RAM buffer 114 might act as a read/write buffer between storage media 118 and communication link 102. Processor 116 includes software and/or firmware as needed for operation, including for tracking and conflict checking of outstanding access requests in accordance with exemplary embodiments of the present invention, as described subsequently. Although shown in FIG. 1 as a single processor, processor 116 might be implemented with multiple processors. For embodiments having multiple processors, inter-processor communication might be employed, such as described in related U.S. patent application Ser. No. 12/436,227, filed on May 6, 2009.

Figure 2:
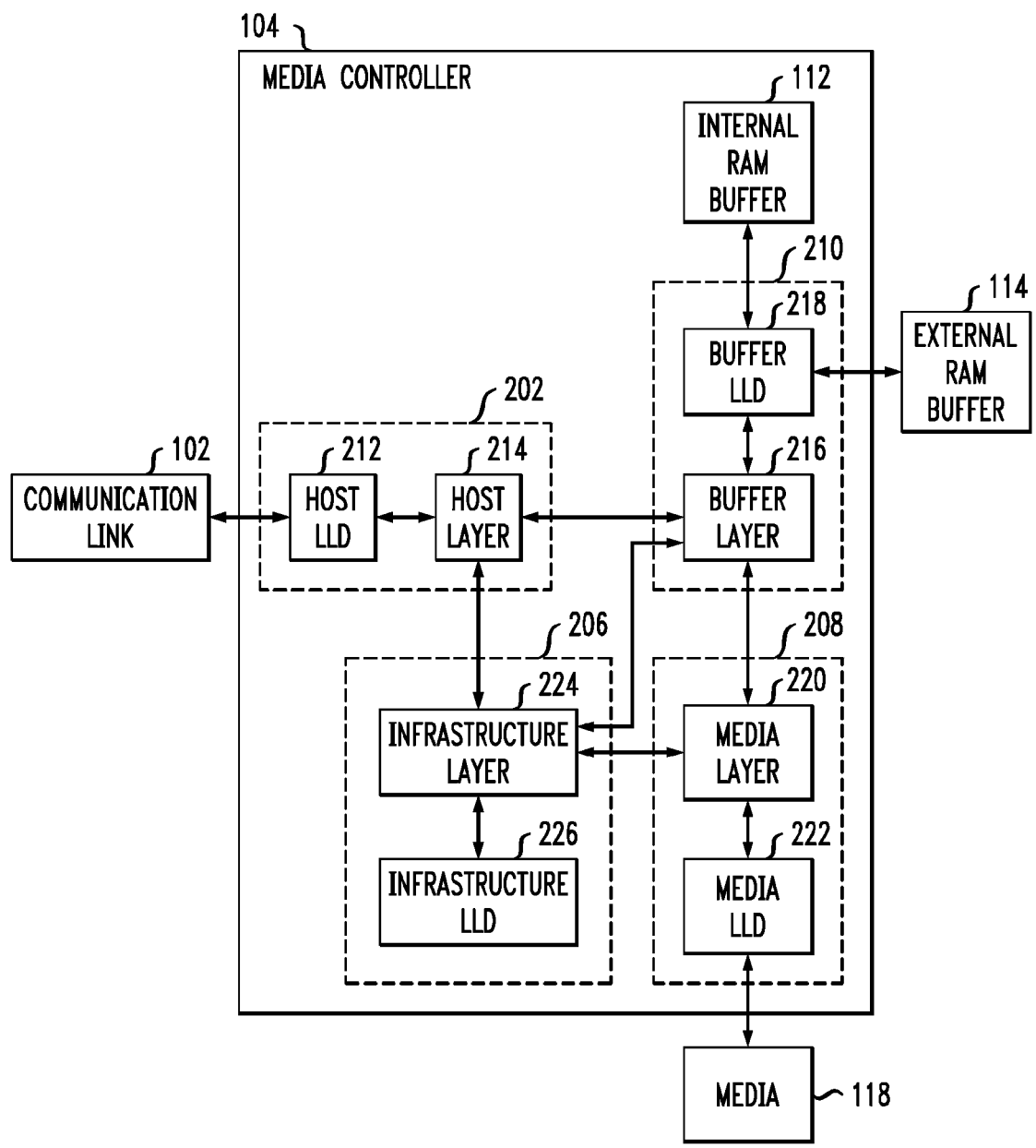
FIG. 2 shows an exemplary functional block diagram of sub-modules employed by the memory storage system of FIG. 1.

FIG. 2 shows an exemplary functional block diagram of sub-modules implemented as software, hardware, or some combination thereof, within media controller 104. As shown in FIG. 2, media controller 104 might employ one or more functional modules, separating low-level hardware-specific signal and timing requirements from higher-level functionality of media controller 104 as a whole. The modules might include Application Programming Interfaces (APIs), which are protocols or formats used by software to communicate, via hardware communication links, between sub-applications within the software. As shown, media controller 104 includes four main modules: host subsystem 202, infrastructure subsystem 206, media subsystem 208 and buffer subsystem 210. Additionally, each of the four main modules within media controller 104 are partitioned into a high level module (e.g., host layer 214, buffer layer 216, media layer 220, and infrastructure layer 224) and a low level process module (e.g., host LLD 212, buffer LLD 218, media LLD 222, and infrastructure LLD 226).

For example, media controller 104 receives one or more requests for media access from external devices, such as requests for read or write operations, from communication link 102. Such requests for access to media 118 generally include at least one logical block address (LBA) where data should be read or written. For example, the requests could be to read from or write to a i) single media address, ii) a group of contiguous media addresses, or iii) a group of non-contiguous media addresses. Requests for one or more contiguous addresses of media 118 might be processed substantially the same as described in greater detail in related U.S. patent application Ser. No. 12/643,471, filed Dec. 21, 2009, and requests for one or more non-contiguous addresses might be processed as described in related U.S. patent application Ser. No. 12/508,915, filed on Jul. 24, 2009. Received requests are processed by host subsystem 202. Host subsystem 202 i) controls host interface-specific commands (e.g. SCSI commands), ii) coordinates host-side data transfers and command execution, and iii) processes any other host commands (e.g. status updates). Host subsystem 202 is in communication with buffer subsystem 210. Host subsystem 202 might track received requests and perform conflict checking substantially as described in related U.S. patent application Ser. No. 12/649,490, filed Dec. 30, 2009.

Media subsystem 208 translates the LBA into a physical address of the desired data. Logical-to-physical and physical-to-logical address translation might be performed as described in related U.S. patent application Ser. No. 12/643,471, filed Dec. 21, 2009. Media subsystem 208 might be implemented to support enterprise system sector sizes (e.g., 520 or 528 bytes per sector), or consumer system sector sizes (e.g., 512 bytes per sector), such as described in related U.S. patent applications Ser. Nos. 12/477,996 and 12/478,013, both filed Jun. 4, 2009.

Media subsystem 208 also interfaces with buffer subsystem 210. Since data transfers between communication link 102 and media 118 might be temporarily stored in buffer memory, buffer subsystem 210 generally directs the data traffic between host subsystem 202 and media subsystem 208. For example, if an external host (not shown) provides, via communication link 102, data to be written to media 118, buffer subsystem 210 might coordinate temporary storage of the data in buffer 114 until media subsystem 208 coordinates writing the data to media 118. Similarly, if the external host requests to read data from media 118, buffer subsystem 210 might temporarily store the data in buffer 114 until host layer 202 coordinates sending the data to the host via communication link 102. Infrastructure subsystem 206 might generally serve as an operating system for media controller 104.

In general, host layer 214 processes higher level host operations (e.g., host command handlers), buffer layer 216 processes higher level buffer and cache operations (e.g., cache and buffer allocation), media layer 220 processes higher level media operations (e.g., logical-to-physical address translation), and infrastructure layer 224 processes higher level processing operations (e.g., operating system operations). In general, host LLD 212 processes lower level host operations (e.g., parsing host commands to the host layer), buffer LLD 218 processes lower level buffer operations (e.g., RAM hardware-specific commands), media LLD 222 processes lower level media operations (e.g., low level read/write/erase), and infrastructure LLD 226 processes lower level operating system operations (e.g., initialization, timers, interrupts).

For example, host layer 214 implements protocols to control flow of data between communications link 102 and media controller 104. Host layer 214 might process data access commands from communication link 102 and communicate with media layer 220. Host LLD 212 implements hardware-specific basic operations of communications link 102, thus, separating the low-level hardware-specific signal and timing requirements of the link protocol from the functionality of host layer 214. In embodiments of the present invention, media layer 220 translates the logical-to-physical addresses (and vice-versa) of data stored in media 118. Media layer 220 might temporarily store data in a target buffer via buffer layer 216.

In general, data transfers between media 118 and communication link 102 are buffered in a target buffer that includes at least one of external RAM buffer 114 and internal RAM buffer 112. Buffer LLD 218 implements hardware-specific basic operations of buffers 112 and 114, thus, separating the low-level hardware-specific signal and timing requirements of RAM from the functionality of buffer layer 216. Media layer 220 interfaces with media 118 by media low-level driver (LLD) 222. Media LLD 222 implements hardware-specific basic read and write operations of media 118, thus, separating the low-level hardware-specific signal and timing requirements of the media circuitry from the functionality of media layer 220. Media layer 220 also might enable error recovery and wear leveling routines for media 118.

Figure 3:
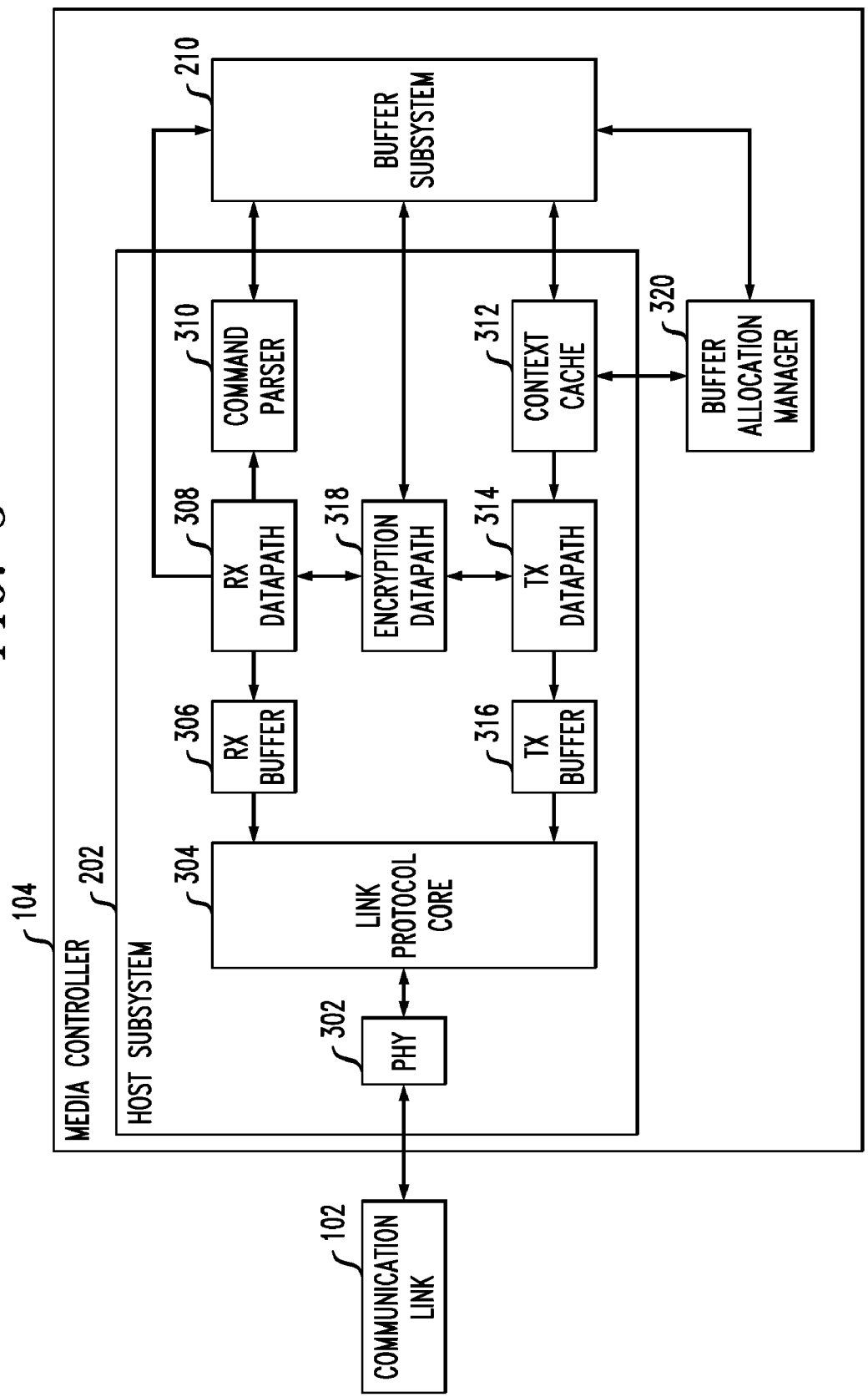
FIG. 3 shows an exemplary block diagram of the host subsystem of FIG. 2, in accordance with embodiments of the present invention.

FIG. 3 shows an exemplary embodiment of host subsystem 202. As shown, host subsystem 202 includes link physical layer (PHY) 302 and Link Protocol Core 304 for communication with communication link 102. As described herein, host subsystem 202 might receive data and commands from host devices coupled to communication link 102. PHY 302 provides an interface to the physical transmission media employed by communication link 102. Link Protocol Core 304 might generally be employed to control the operation of PHY 302. Thus, PHY 302 might correspond to host LLD 212 and Link Protocol Core 304 might correspond to host layer 214.

Receive (RX) Datapath 308 handles incoming data from link protocol core 304 and routes the incoming data to the buffer (e.g., buffer subsystem 210) or to other internal modules (e.g., command parser 310, encryption datapath 318, etc.). RX Datapath 308 might include a buffer (e.g., RX buffer 306) to synchronize data between the timing requirements of link protocol core 304 and the timing requirements of host subsystem 202. For example, data might be sent in frames for a given link protocol, and RX Datapath 308 might reorganize the framed data into data blocks for further processing within media controller 104. The buffer might be sized to support required bandwidth for both the link protocol and the internal communications within media controller 104.

Command Parser 310 receives commands from RX Datapath 308, and generates contexts corresponding to the command. In general, a context is a data structure employed within media controller 104 to specify the information necessary to send or receive data (e.g., the requirements to send a data frame or frame information structure (FIS) via communication link 102, the requirements to perform direct memory access (DMA), etc.). New contexts are added to the tail end of a context execution queue, which is one of a plurality of linked lists created by firmware operating on processor 116 and stored in cache memory (e.g., a cache in at least one of RAM buffer 112 and RAM buffer 114 of FIG. 1) controlled by buffer subsystem 210. Context cache 312 loads contexts from the head of the linked lists before the previous contexts complete, allowing firmware running on processor 116 to queue or reorder context lists before the data transfers are started. Buffer Allocation Manager (BAM) 320 might generally provide acceleration for the transfer of user data between host subsystem 202 and buffer subsystem 210, for example by performing cache lookup for a context or allocating buffer space for a context.

FIG. 3 shows generally an implementation of host subsystem 202 that supports a single-port host communication protocol, such as for consumer systems. However, host subsystem 202 might also support two-port operation, such as for enterprise systems. As shown in FIG. 3, a single port implementation of host subsystem 202 generally does not include modules to support two ports. For example, a two-port SAS implementation of host subsystem 202 might generally include a first link protocol code (Port A) and a second link protocol core (Port B). Similarly, a two-port implementation of host subsystem 202 might include an RX buffer and RX Datapath for each port. The modules of host subsystem 202 operate substantially similarly for single-port consumer devices (e.g., SATA devices) and two-port enterprise devices (e.g., SAS devices).

As will be described herein, embodiments of the present invention generally employ two sets of keys: i) a first set of keys used by DSE 406 to encrypt and decrypt user data, and ii) a second set of keys that are plaintext user passwords used to authenticate a host device. Once authenticated, the host device may perform operations allowed by the storage device settings. Embodiments of the present invention associate plaintext passwords used in authentication (PAKs) to the data encryption keys (DKs).

Figure 4:
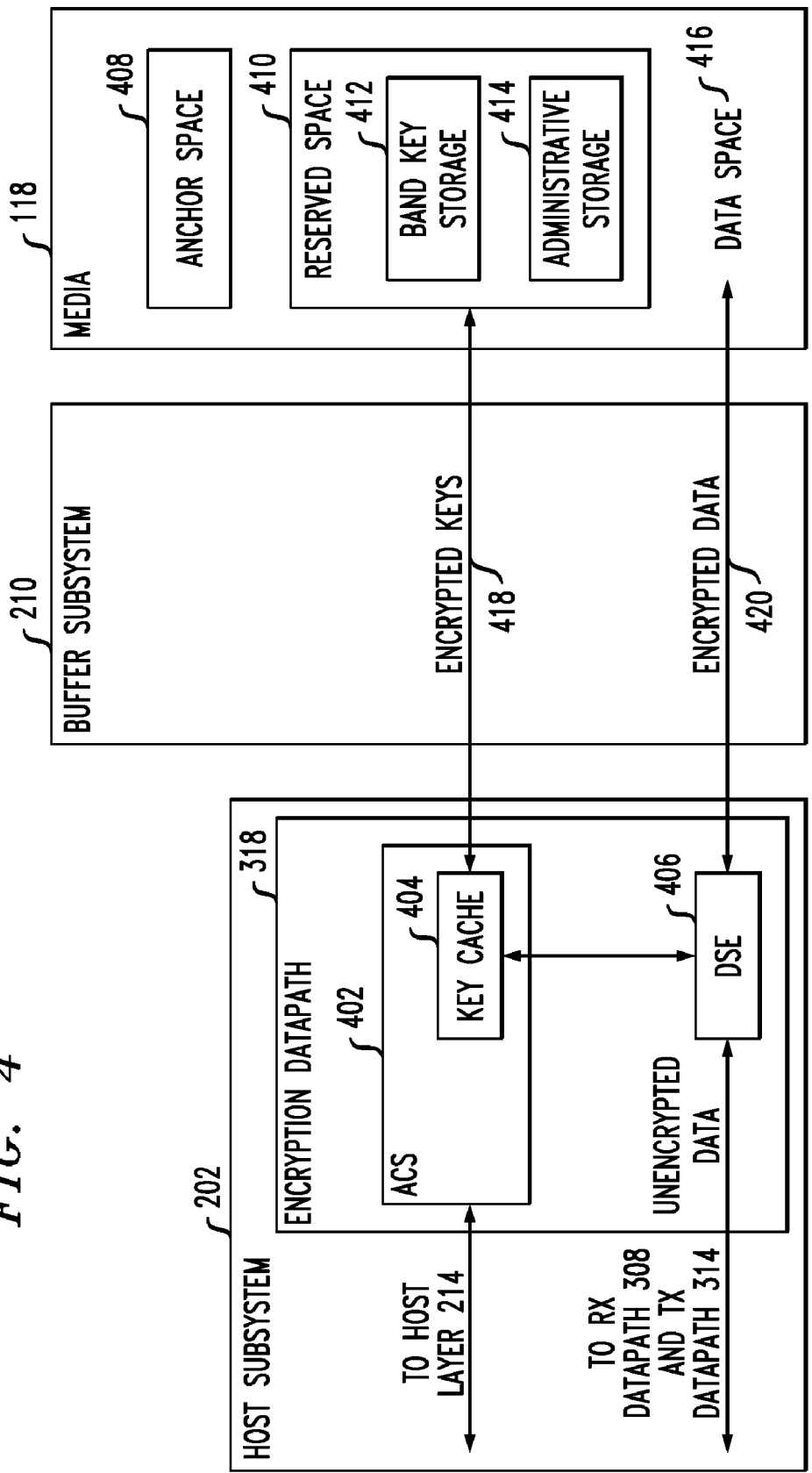
FIG. 4 shows an exemplary block diagram of the encryption datapath of FIG. 3, in accordance with embodiments of the present invention.

FIG. 4 shows an exemplary embodiment of Encryption Datapath 318 of FIG. 3. As shown in FIG. 4, Encryption Datapath 318 includes Access Control System (ACS) 402 and Data Security Engine (DSE) 406. As will be described, ACS 402 generally determines access to media 118. DSE 406 generally provides encryption/decryption of data written to or read from media 118. As shown, ACS 402 is in communication with host layer 214, to allow configuration and validation of Encryption Datapath 318 (e.g., setting passwords and data keys, defining LBA access ranges, etc.), or to enable or disable encryption entirely. ACS 402 provides encryption keys to DSE 406, but is otherwise independent from the encryption of user data. ACS 402 might be employed to lock and unlock data transfer capability of media controller 104 to a host device. DSE 406 provides encryption and decryption of user data, employing a key from key cache 404 in ACS 402. As indicated by dashed line 420, DSE 406 might temporarily store encrypted data in buffer subsystem 210 as encrypted data is read from or written to media 118. Host subsystem 202 configures data transfer contexts with appropriate settings of DSE 406, such as providing a corresponding entry from key cache 404.

As shown in FIG. 4, media 118 might be divided into one or more separate physical spaces, shown as anchor space 408, reserved space 410 and data space 416. Anchor space 408 might contain data that must be stored in particular physical position in media 118, for example a portion of the software or firmware for media controller 104, or configuration files or other data required by media controller 104 at power up. Data space 416 holds all user data, and might be divided into one or more LBA ranges (bands) (not shown). Reserved space 410 is not accessible by host requests (e.g. host read and write requests) and, thus, reserved space 410 generally might not have corresponding host-accessible LBAs. Reserved space 410 might be used to store mapping data (e.g., a flash translation table) or other data used by media controller 104. For example, as shown in FIG. 4, reserved space 410 might include band key storage area 412 and administrative storage area 414.

Key cache 404 couples ACS 402 to DSE 406 and holds one key for each user-defined LBA range ("band"). Key cache 404 is loaded when LBA bands are authenticated and locked or unlocked by commands defined in the TCG specifications ("TCG commands") such as, for example, the Set Band Lock command as defined in the TCG Enterprise Specification. Key cache 404 might include one or more band key entries for the encrypted keys corresponding to each band. Each band's corresponding key might be stored in a separate file in band key storage area 412, which provides independent modification of keys for each band. As indicated by dashed line 418, when a band is unlocked via TCG commands, the encrypted key for the band might be loaded into a buffer (e.g., one of buffers 112 and 114 of FIG. 1) from the corresponding file in band key storage area 412. ACS 402 reads the encrypted key from buffer subsystem 210, decrypts the key and loads the decrypted key into key cache 404. Key cache 404 also might have an entry for the root key to be used as a data key. Administrative storage area 414 is an encrypted storage area that can be read and written via TCG commands. Administrative storage area 414 might contain data related to the management of the security system, such as a plaintext manufacturer's password ("Maker's password"), and an encrypted hashed Maker's password.

Figure 5:
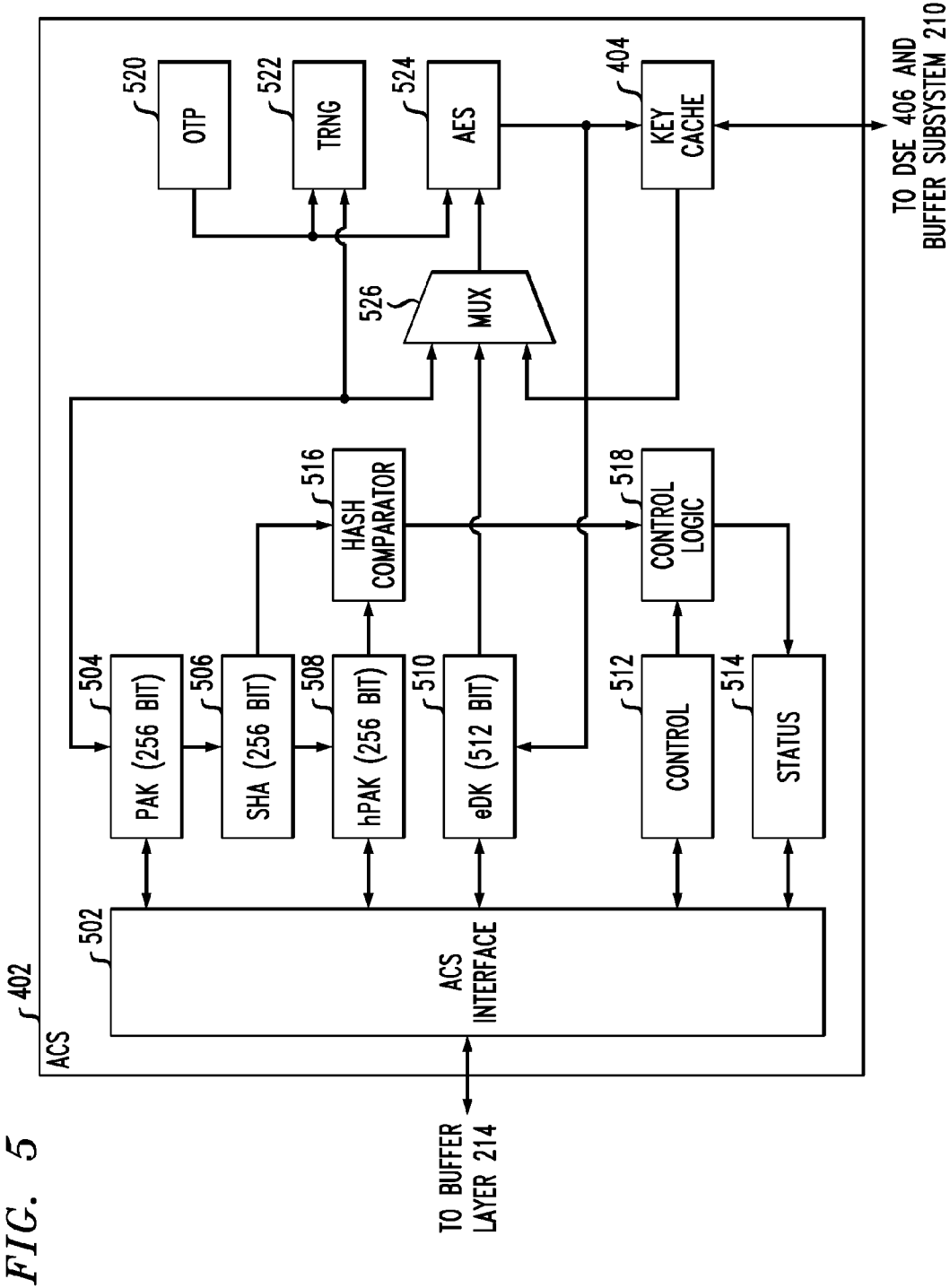
FIG. 5 shows an exemplary block diagram of the access control system of FIG. 4, in accordance with embodiments of the present invention.

FIG. 5 shows an exemplary architecture of ACS 402. ACS 402 performs authentication and key generation with relatively little access from components of media controller 104 external to encryption datapath 318, such as infrastructure subsystem 206. ACS 402 generally limits any direct or indirect knowledge of data keys to encryption datapath 318. Other components of media controller 104, such as host subsystem 202 or infrastructure subsystem 206, only interact with plaintext passwords during the authentication process. All interactions between ACS 402 and external modules are via registers, for example status register 512 and control register 514.

As shown in FIG. 5, ACS interface 502 provides an interface to host layer 214. ACS interface 502 might generally be implemented as an AMBA High-performance Bus (AHB), as introduced by ARM Limited and often employed in Systemon-a-Chip (SoC) designs. Status register 514 and control register 512 allow host layer 214 to start and observe the operation of ACS 402.

ACS 402 includes one-time programmable (OTP) memory 520. OTP 520 might generally be employed to store the root key (RK) of media controller 104. In embodiments of the present invention, the root key is a 256-bit random value that is generated and stored in OTP 520 at the manufacture time of media controller 104, however other sizes of the root key (e.g., 512-bit) are possible. The RK is generally not accessible by any modules of media controller 104 outside of ACS 402. In accordance with the Federal Information Processing Standard (FIPS), the RK is generated by a random number generator (RNG). Also in accordance with FIPS, the RK might be permanently and irreversibly zeroed, which renders media controller 104 completely unusable. Truly Random Number Generator (TRNG) 522 generates data keys. In embodiments of the present invention, TRNG 522 might be an RNG operating in conformance with the Advanced Encryption Standard (AES) defined in FIPS Publication 197.

The AES defines a 128-bit block cipher with a variable key size of 128, 192 or 256 bits. The AES further specifies electronic codebook (ECB) and cipher-block chaining (CBC) modes. AES 524 is a block cipher module. In embodiments of the present invention, AES 524 might operate in ECB-mode to encrypt keys that are stored on media 118. Unencrypted keys are generally not accessible by modules of media controller 104 outside of ACS 402, but encrypted keys are stored on media 118, and thus might be accessible by DSE 406, buffer subsystem 210 and media subsystem 208. Secure Hash Algorithm (SHA) module 506 generates a hash of plaintext authentication key (PAK) 504. In embodiments of the present invention, SHA module 506 operates in accordance with the Secure Hash Standard (SHS) defined in FIPS Publication 180-3. The hashed PAK (hPAK) 508 is compared, by hash comparator 516, to hashed data key values read from media 118. Thus, hash comparator 516 validates a plaintext authentication key (PAK) without saving the PAK to media 118. If validation fails, the requested authentication fails and operations requiring that level of authentication cannot complete.

ACS 402 generates an encrypted Data Key (eDK) 510 for each band of media 118. The eDK 510 is generated based upon contains three components: i) a Data Key (DK) randomly generated by TRNG 522, ii) a Key Wrap, and iii) an Authentication Hash Key (AHK). DK, Key Wrap, and AHK are not accessible to modules of media controller 104 outside of encryption datapath 318 in an unencrypted format. The DK is the key used by DSE 406 to encrypt and decrypt data for a specific user and/or band. The AHK is a randomly generated key input to SHA module 506 to hash the password into a hashed Password Authentication Key (hPAK). The hPAK is provided to modules outside of encryption datapath 318, such as infrastructure subsystem 206, and the hPAK is saved for password authentication. The Key Wrap is an encryption key used to encrypt key data, such as described in the AES Key Wrap Specification, NIST (2001), and incorporated by reference herein. In general, the eDK might typically be 448, 576, or 832 bits. For example, a key wrapped eDK with an hPAK will have a size that is the key size+320 bits (64 bits for the key wrap plus 256 bits for the AHK). Thus, for a key size of 128 bits, the eDK is 448 bits, for a key size of 256 bits, the eDK is 576 bits, and for a key size of 512 bits, the eDK is 832 bits.

Figure 6:
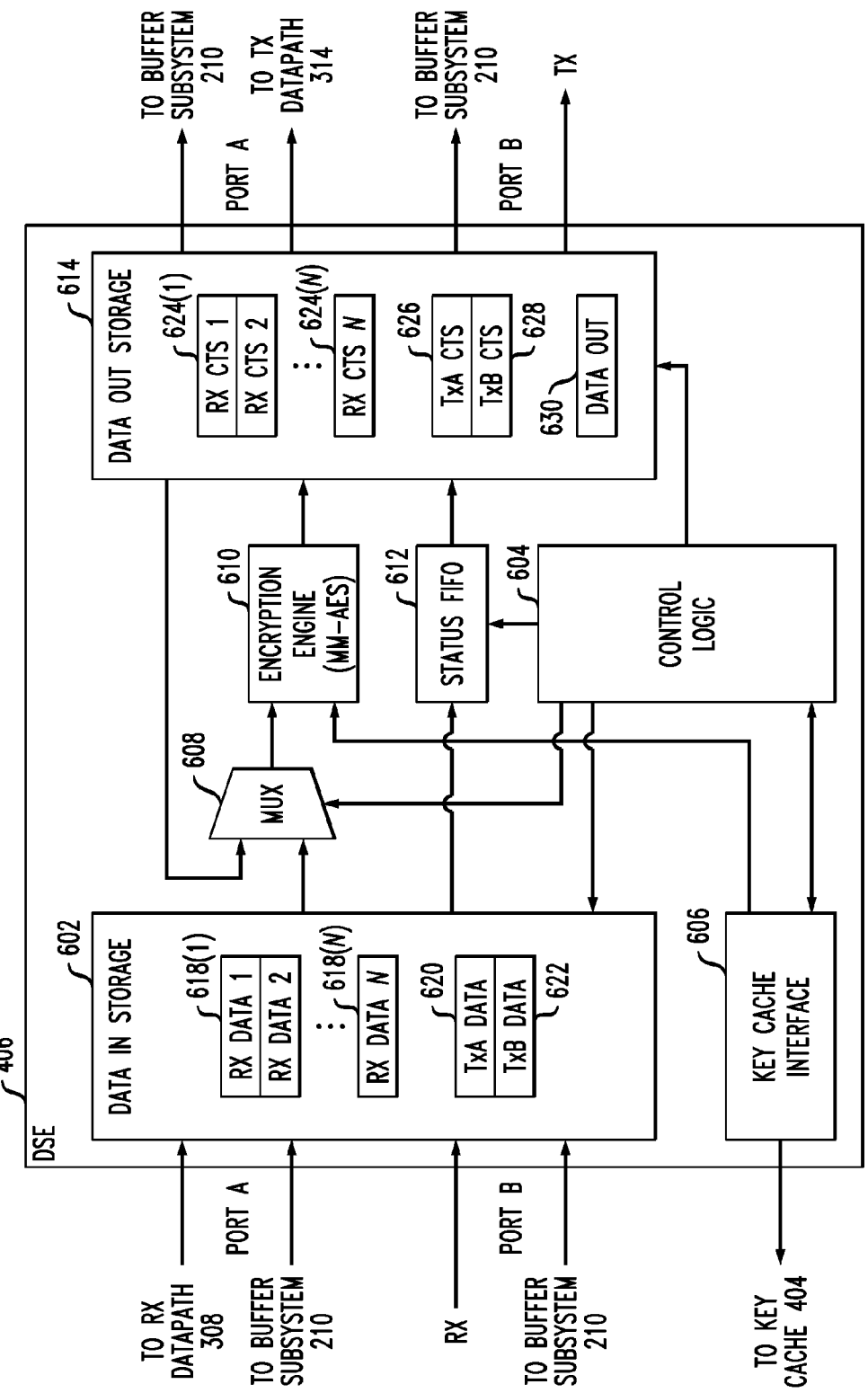
FIG. 6 shows an exemplary block diagram of an enterprise data security engine, in accordance with embodiments of the present invention.

FIG. 6 shows an embodiment of Data Security Engine (DSE) 406 for an enterprise device. As described herein, enterprise devices might generally employ a two-port communication protocol (e.g., SAS). DSE 406 provides encryption and decryption of data by employing data keys stored in key cache 404. Each key stored in key cache 404 corresponds to an active host transfer context. As shown in FIG. 6, Data In Storage 602 receives data from three possible inputs (RX for Port A, RX for Port B and Buffer Subsystem 210 for both Port A and Port B). The received data is stored into 128-bit storage registers. Embodiments of the present invention might employ one or more storage registers for each input port, shown as RX data registers 618(1)-618(N), and TX data registers 620 and 622. The total number of storage registers might be equal to the number of threads supported by encryption engine 610.

Encryption engine 610 provides data encryption and decryption within DSE 406. Encryption engine might operate in accordance with the AES. In exemplary embodiments of the present invention encryption engine 610 supports up to seven encryption threads. One thread might be dedicated to encrypt data for each read path (RX Port A and RX Port B) of host subsystem 202. The remaining five threads might be allocated to process multiple write commands that are in process. For example, two threads might be dedicated to each write path to decrypt data, and the final thread might be dedicated to processing "out-of-band" encryption to support infrequent or specialized commands such as write same commands, format commands, and read/write operations for administrative storage area 414. Data is sent to encryption engine 610, while corresponding status data is sent to Status FIFO 612.

Key Cache Interface (KCI) 606 couples DSE 406 to Key Cache 404. KCI 606 requests keys based on instructions from Control Logic 604. Encryption engine 610 performs AES encryption and decryption based on the data received from Data In Storage 602. The order in which data is provided from Data In Storage 602 to encryption engine 610 is controlled by Control Logic 604. Status FIFO 612 is employed to track status data that is not encrypted along with its corresponding data in encryption engine 610. For example, status data might include a thread ID corresponding to the data, flags indicating whether the current data block is the first or last data block of a sector, and a flag to indicate whether cipher text stealing (CTS) is required for the data block. Status FIFO is also controlled by Control Logic 604.

Data Out Storage 614 receives data from encryption engine 610 and reassembles the data with its corresponding status data processed by status FIFO 612. Data Out Storage 614 also manages cipher text stealing (CTS). CTS is employed when a data block size is not equal to a multiple of the encryption block size. When the data block size is not a multiple of the encryption block size, a "runt block" might result that is smaller than the encryption block size. CTS is employed to encrypt such "runt blocks without expanding the size of the stored data block. For example, embodiments of the present invention might employ a data block size of 520 bytes, and an encryption block size of 128 bits (16 bytes). In that case, the data block size is not a multiple of the encryption block size, and an 8 byte "runt block" is left over. This 8 byte "runt block" is encrypted using CTS. Similarly as Data In Storage 602, Data Out Storage 614 has one storage register per thread processed by encryption engine 610, shown as registers RX CTS 624(1)-624(N), TX CTS 626 and 628, plus generic Data Out register 630. Data output from encryption engine 610 is either routed i) to one of CTS registers 624(1)-624(N), 626 or 628, or ii) to generic Data Out register 630. If the output data block is not the last block for the sector, the data block is routed to one of CTS registers 624(1)-624(N), 626 or 628. Data currently in that CTS register is provided to the appropriate data path (e.g., the TX datapath for Port A or Port B, or Buffer Subsystem 206). If the output data block is the last block of the sector, it is routed to OutData register 630.

When a "runt block" exists and CTS is required, the contents of Data Out register 630 are provided to the appropriate data path followed by any data in the corresponding one of CTS registers 624(1)-624(N), 626 or 628. When CTS is required, the data stored in the corresponding one of CTS registers 624(1)-624(N), 626 or 628 is fed back into encryption engine 610. As shown, multiplexer 608, controlled by control logic 604, determines which of Data In Storage 602 and Data Out Storage 614 provide the input to encryption engine 610. Encryption engine 610 also receives any "runt" blocks. The entries in the CTS register are invalidated and are not provided to the corresponding datapath. When the last data block is processed, an equivalent runt block is in the corresponding one of CTS registers 624(1)-624(N), 626 or 628, and the runt block is sent, after the data from Data Out register 630, to the appropriate datapath. If CTS was not required, the feedback loop is disabled, and the data in the corresponding one of CTS registers 624(1)-624(N), 626 or 628 is sent to the appropriate datapath, followed by the data in Data Out register 630.

Figure 7:
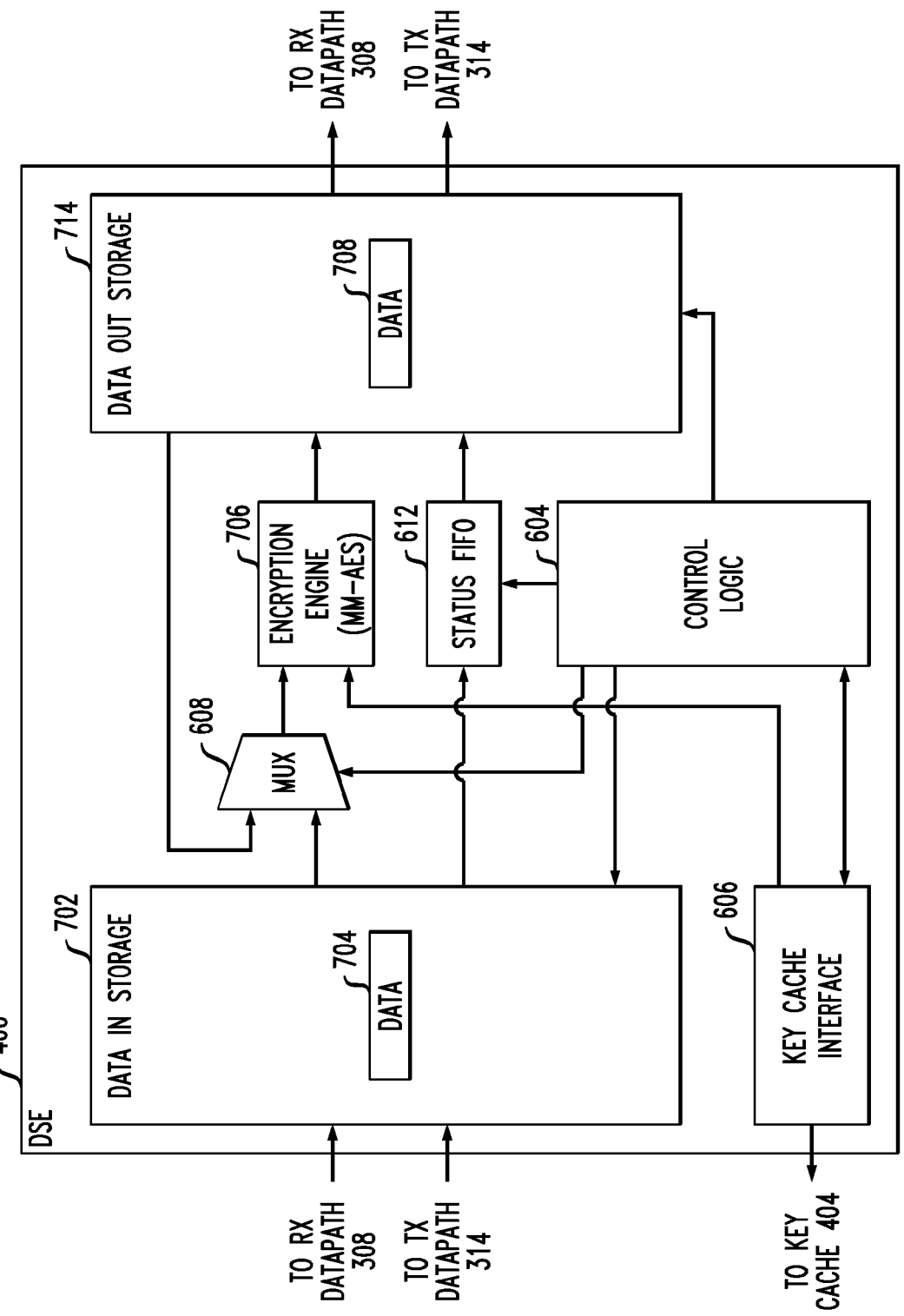
FIG. 7 shows an exemplary block diagram of a consumer data security engine, in accordance with embodiments of the present invention.

FIG. 7 shows an embodiment of Data Security Engine (DSE) 406 for a consumer device. As described herein, consumer devices might generally employ a single port communication protocol (e.g., SATA). As described in regard to FIG. 6 for enterprise devices, DSE 406 for consumer devices operates substantially similarly to provide encryption and decryption using data keys stored in key cache 404. As shown in FIG. 7, for consumer devices, support for i) multiple host ports and ii) multiple thread processing is removed, since they are generally not required for a single port host protocol. As shown in FIG. 7, for consumer devices, Data In Storage 702 and Data Out Storage 714 might be scaled-down implementations of Data In Storage 602 and Data Out Storage 614 as shown in FIG. 6 for enterprise devices. For example, Data In Storage 702 and Data Out Storage 714 might each include only a single register, shown as data registers 704 and 708, respectively, since consumer devices generally only support a single-port communication protocol and one active transfer thread at a time.

Figure 8:
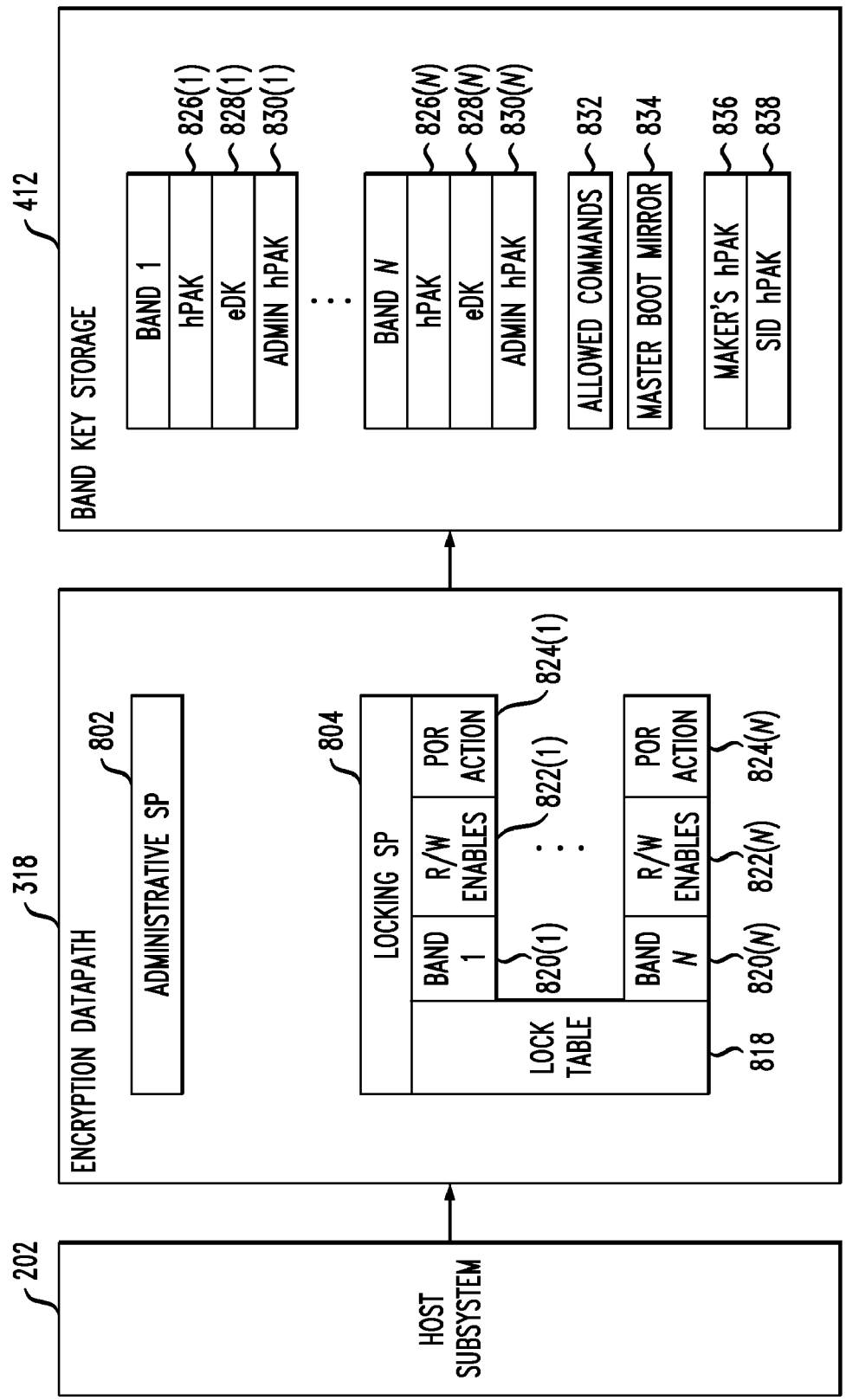
FIG. 8 shows an exemplary block diagram of a locking architecture, in accordance with embodiments of the present invention.

FIG. 8 shows a block diagram of a locking architecture for full disk encryption (FDE). This architecture is employed for communications between a host device and media controller 104, and does not directly involve encryption of user data. The locking architecture shown in FIG. 8 provides locking of a user's access to encrypted data stored on media 118 and the user's permissions to manage media controller 104. ACS 402 might assign and manage a session ID (SID). The SID is used for sessions in progress that are performing TCG commands to control and configure the TCG tables. As shown in FIG. 8, encryption datapath 318 might include two Security Providers (SP): i) Administrative SP 802, and ii) Locking SP 804. Each SP is a collection of tables that are settable using TCG commands (e.g., the Get, Set or Authenticate TCG commands). Administrative SP 802 is generally employed to retrieve device information and configuration.

Locking SP 804 controls data encryption and locking/unlocking of bands of media 118, and maintains Lock Table 818 that, for each band 820(1)-820(N) of media 118, contains: i) read/write lock enable settings 822(1)-822(N), and ii) power on reset (POR) settings 824(1)-824(N). To lock and unlock the storage device, a host device employs a plaintext password to authenticate and modify the locking tables. The host might set R/W enables 822(1)-822(N) to enable or disable read locks and write locks. Depending on the reset handling states set in POR Action 824(1)-824(N) in Lock Table 818, locks might persist when a reset or a power-on event occurs. Once unlocked, key cache 404 loads the key for the band unlocked. Embodiments of the present invention employ an index for key cache 404 that is the same value as the band index. Thus, a User-N password is associated with band N of media 118.

Read/write lock enable settings 822(1)-822(N) are modified to lock or unlock the corresponding band. For example, to lock or unlock a band of media 118, a user of a host device creates a session with media controller 104, authenticates for the specific band using their plaintext password for that band, and modifies the corresponding one of read/write lock enable settings 822(1)-822(N) of Lock Table 818. The user may also change the behavior of media controller 104 on reset condition. For example, once a band is unlocked, it might remain unlocked for all host devices until: i) the user relocks the band, or ii) a power on reset (POR) condition occurs, depending on POR settings 824(1)-824(N). For example, for a POR condition, one or more bands might be set to return to a locked state, regardless of their status when the reset occurred. POR settings 824(1)-824(N) might also include settings for lock status during any power-saving modes of media controller 104.

As shown in FIG. 8, the locking architecture uses Band Key Storage 412 of media 118 to store one or more passwords and a single key for each band of media 118. As shown, each band 1-N might have a corresponding eDK value, shown for Bands 1-N as eDKs 828(1)-828(N). Each band might also have one or more corresponding hPAKs 826(1)-826(N) and one or more corresponding Administrative hPAKs 830(1)-830(N). As described herein, hashed authentication keys (hPAK) 826(1)-826(N) are the hashed plaintext passwords used by a specific user to unlock the corresponding band of media 118. As shown in FIG. 8, eDK 828(1)-828(N) are encrypted data keys used by DSE 406 to encrypt and decrypt user data. Administrative (Admin) hPAK 830(1)-830(N) might generally allow for an administrator to have access to substantially all bands of media 118. Thus, some embodiments of the present invention provide that more than one key can apply to any one band of media 118.

Other data might also be tracked and stored in Band Key Storage 412, for example, a list, 832, of allowed commands to media 118 might be kept, and a mirror, 834, of the master boot record (MBR) might be stored. For example, the TCG Opal Specification requires the addition of allowed commands list 832 and Master Boot Record mirror 834. Allowed commands list 832 allows media controller 104 to check that a received command is allowed before processing the command. MBR mirror 834 allows running a secure pre-boot authentication on storage device startup to perform device unlocking without allowing access to data on media 118. Similarly, the hashed Maker's Password, 836, and the hashed Session Identifier (SID) Password list, 838, might be stored in Band Key Storage 412. SID Password list 838 might generally be used to identify specific active host device sessions with media controller 104.

In accordance with the TCG Specifications, when a storage device is activated and enrolled, one or more bands of media 118 are defined in Lock Table 818 to discriminate one band from another by employing different keys and passwords. In exemplary embodiments of the present invention, the maximum number of bands might be equal to the maximum number of entries in key cache 404. Each band has a unique encryption key and password.

Figure 9:
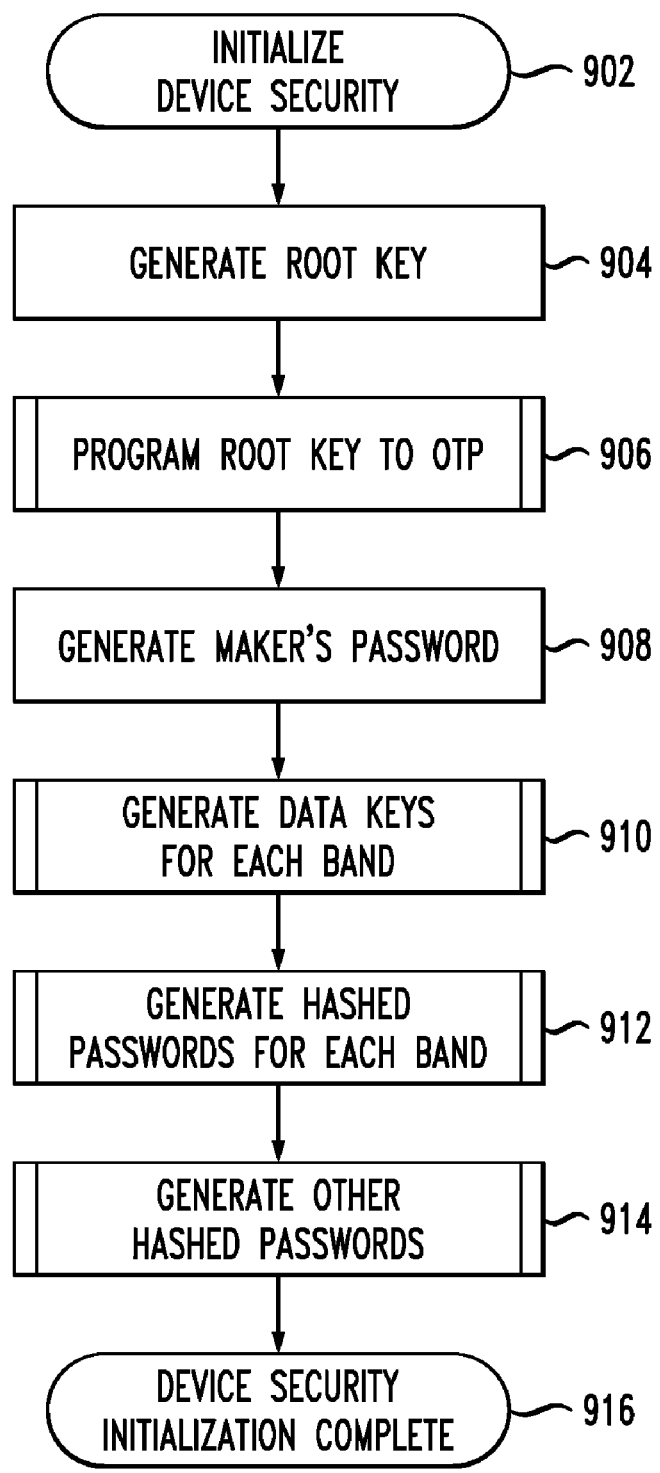
FIG. 9 shows a flow diagram of a process for initializing a data security engine, in accordance with embodiments of the present invention.

FIG. 9 shows device security initialization routine 900, which might generally be performed when manufacturing media controller 104. Device security initialization routine 900 might generally be performed as part of a manufacturing test after media controller 104 has been programmed with firmware, and the steps of routine 900 might be performed by media controller 104, an external chip tester, or some combination thereof. At step 902, device security initialization routine 900 is started. At step 904, a Root Key (RK) is generated. The RK is a pair of randomly generated 256-bit keys that, at step 906, is stored in one-time programmable (OTP) memory 520 (described in greater detail with regard to FIG. 10). OTP 520 allows zeroing of the RK in accordance with FIPS. The contents of OTP 520 are not accessible by components external to ACS 402, thus, the RK is not encrypted for transfer from OTP 520 to ACS 402 or to DSE 406.

At step 908, a Maker's Password is generated, which is employed at the time of manufacture to initialize all other passwords. The Maker's Password is generated by TRNG 522. In accordance with the TCG Specifications, invalid characters in the random values returned from TRNG 522 might be parsed out by ACS 402; thus, a request for one or more values from TRGN 522 might be required to complete the Maker's Password. In exemplary embodiments of the present invention, the Maker's Password is 32 bytes. The Maker's Password is saved as a plaintext password in Band Key Storage 412, and later might be transferred by media controller 104 to a user during device personalization.

At step 910, the data keys for each band of media 118 are generated. ACS 402 loads a password authentication key (PAK) from register 504, (during device initialization routine 900, the loaded PAK is the Maker's Password) and TRNG 522 generates a random AHK and a random DK. A hashed PAK (hPAK) is generated by SHA module 506 based on the value in PAK register 504 and the AHK value. Generating the hPAK based on the PAK and the AHK is what ties each hPAK to a respective band of media 118. The hPAK is stored in hPAK register 508. An encrypted data key (eDK) is generated by AES module 524 based on the random DK and the random AHK, each generated by TRNG 522. The resulting eDK is stored in eDK register 510. As shown in FIG. 8, the eDK and the hPAK are saved to Band Key Storage 412 for use in key cache loading and in authentication.

At step 912, the hashed passwords for each band of media 118 are generated. Initially, all passwords might be set to a default value, for example, the Maker's Password. Thus, step 912 might save the Maker's Password hPAK value as the hPAK value for other passwords of media controller 104. After step 912, each band of media 118 has one hPAK and one Administrator hPAK, such as shown in FIG. 8. At step 914 other hashed passwords, not necessarily related to bands of media 118, are generated. These hashed passwords might be authentication keys employed by an Administrative Security Provider for authentication. These password hashes are generated based on the global band of media 118 (i.e. a band accessible by all users of media 118). For example, a default setting of media controller 104 might define one or more bands of media 118, but only enable one band, the "global band".

The global band covers all of media 118, and allows access and control to the Administrator, User-1 (e.g., the user of band 1), and Maker's Passwords. As described, the global band's encryption key might be used by default. Encryption datapath 318 is always active on a device, regardless of whether a user has activated encryption. If the user does not activate the encryption system, the Maker's Password and Maker's Hashed Password are employed to unlock the global band by default. If the user changes any of the passwords, or redefines access to any bands of media 118, the band-specific passwords are employed.

Figure 10:
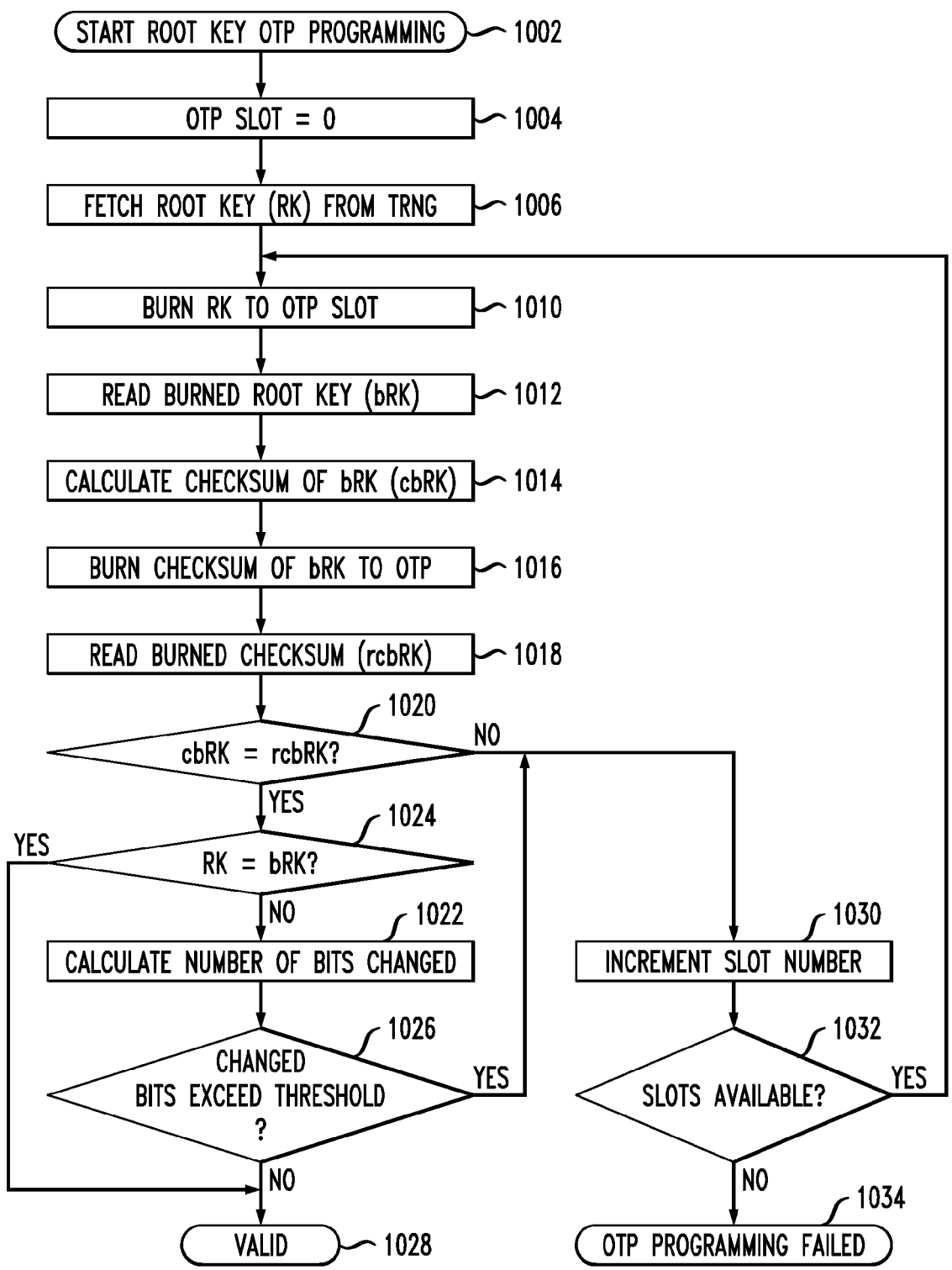
FIG. 10 shows a flow diagram of a process for storing a root key to a one-time programmable memory, in accordance with embodiments of the present invention.

FIG. 10 shows a flow diagram of Root Key (RK) OTP programming routine 906 of FIG. 9. As described herein, TRGN 522 generates the RK value. ACS 402 then burns the generated RK value to one of the first N slots of OTP 520. At step 1002, RK OTP programming routine starts. At step 1004, ACS 402 selects the first slot (slot 0) of OTP 520. At step 1006, ACS 402 retrieves the RK from TRNG 522. At step 1010, the RK value is burned to the first slot of OTP 520. At step 1012, ACS 402 reads the burned slot of OTP 520, returning a read burned RK (bRK). At step 1014, ACS 402 calculates the checksum (cbRK) of the bRK value read at step 1012. At step 1016, the checksum (cbRK) is also burned into the OTP slot. At step 1018, the burned checksum is read-back from the OTP slot (rcbRK). If, at step 1020, the calculated checksum (cbRK) of the bRK (from step 1014) and the read-back burned checksum (rcbRK) (from step 1018) are equal, then the burned key matches the intended value, and the process continues to step 1024. Otherwise, if, at step 1020, the calculated checksum (cbRK) and the read-back burned checksum (rcbRK) are not equal, then the process continues to step 1030.

At step 1024, if the RK of step 1006 and the read-back burned RK (bRK) of step 1012 are equal, the RK and checksum were successfully burned to OTP 520, and process 906 ends at step 1028. If, at step 1024, the RK of step 1006 and the read-back burned RK (bRK) of step 1012 are not equal, the process continues to step 1022. At step 1022, the number of changed bits between the RK and the burned RK is calculated, for example, by a logical exclusive-or (XOR) operation. At step 1026, if the number of changed bits does not exceed a threshold, the process continues to step 1028.

If, at step 1026, the number of changed bits does exceed a threshold, the process continues to step 1030. At step 1030, since the RK and the checksum were not burned successfully, the slot number of OTP 520 is incremented. If, at step 1032, slots in OTP 520 are available, the process returns to step 1010, to burn the RK and checksum to the next slot of OTP 520. If, at step 1032, all slots of OTP 520 are used, then media controller 104 is deemed faulty, and OTP programming fails at step 1034.

Authentication of a user session, in accordance with the TCG Specifications, requires validation of a plaintext password (PAK). If the PAK is the Administrative password, since a hash for the Administrative password was generated and stored for each band as shown in FIG. 8, then access can be authenticated for any band of media 118. If the PAK is one of the User-N passwords, since a hash for each user password was generated and stored for the corresponding band as shown in FIG. 8, then access can be authenticated for the corresponding band of media 118.

FIG. 11 shows a flow diagram of plaintext password authentication process 1100. As shown in FIG. 11, at step 1102, a plaintext password (PAK) is received as a user requests access to data on media 118. At step 1104, the received PAK is stored to PAK register 504 of FIG. 5. At step 1106, the hashed plaintext password (hPAK), generated when the password was initially generated, is retrieved from reserved space 410 of media 118. At step 1108, the Root Key (RK) is retrieved from OTP 520 and the encrypted Data Key (eDK) is retrieved from reserved space 410 of media 118. At step 1110, the Authentication Hash Key (AHK) is generated by AES module 524 based on the RK and the eDK. At step 1112, the unencrypted Data Key (DK) is generated by AES module 524 based on the eDK and the RK. At step 1114, SHA module 506 generates a hashed version of the received PAK based on the AHK.

At step 1116, the hPAK retrieved from reserved area 410 is compared to the hPAK generated from the received PAK. If, at step 1116, the retrieved hPAK and the received hPAK are not equal, at step 1118, authentication of the received plaintext password fails. If, at step 1116, the retrieved hPAK and the received hPAK are equal, at step 1120, it is determined if the received plaintext password is either an administrative password, or a user password. If, at step 1120, the received PAK is an administrative password, at step 1122, the received password is authenticated for administrative access to at least one corresponding band of media 118. For example, an administrative password might allow a greater level of access to a single band, or might allow access to one or more bands or media 118. If, at step 1120, the received PAK is not an administrative password, at step 1126, the received password is authenticated for non-administrative access to at least one corresponding band of media 118. After steps 1122 or 1126 complete, plaintext password authentication process 1100 is successfully complete at step 1124. An authenticated user has authority to perform tasks (e.g., loading DKs) as permitted by the TCG tables.

After a user authentication is complete at step 1124, key cache 404 might be loaded with the DK for the accessed band, for example, whenever a key is opened. Thus, whenever a PAK for a band is successfully authenticated by plaintext password authentication process 1100, if the bands are unlocked to allow read or write access, the entry of key cache 404 corresponding to the band might be updated. The index into key cache 404 matches the band number for processing of host data transfer contexts.

In order to change a plaintext password, the current password is first authenticated, such as described with regard to FIG. 11. This ensures that a valid password is provided in order to generate any new password. The authenticated password need not match the password to be changed. The authenticated password only needs to i) be a valid password, and ii) have sufficient permissions to reset the desired password (e.g., an administrator might have permission to change the administrator password and any user password). A new Password Authentication Key (PAK) is generated by TRNG 522, or might be provided by the original password owner, and is stored to register 504. A hashed value of the new PAK (hPAK) is generated based on the existing Authentication Hash Key (AHK). The new hPAK value is stored to hPAK register 508. If a password applies to more than one band, such as an administrative password, then the password update routine is performed for each band.

To change a data key (DK) for one or more bands, a valid PAK and hPAK value for the band are required. A host device might change the DK for one or more bands, for example, to erase, repurpose or decommission the storage device. The PAK, hPAK, and eDK values are loaded into registers 504, 508 and 510, respectively, to generate a new DK. If the PAK/hPAK is valid, ACS 402 requests a new DK from TRNG 520. AES module 524 then generates the new eDK based on the new DK. The new eDK is saved in Band Key Storage 412. The Authentication Hash Key (AHK) is not changed, since changing the AHK would invalidate all password hashes (hPAKs), which could then not be regenerated without each plaintext password (PAK). In accordance with the FIPS standard, embodiments of the present invention also provide for complete erasure of all data keys, including the root key, to allow for complete decommissioning of a storage device without the data keys being useable.

Thus, as described herein, embodiments of the present invention provide a media controller for a storage device that burns a root key and corresponding checksum to a slot in a one-time programmable (OTP) memory. The root key generally might be programmed at the manufacture time of the storage device, rather than at the manufacture time of the media controller System-on-Chip (SoC). Embodiments of the present invention might also employ the root key and checksum burning as a test of the media controller SoC to detect failed devices (e.g., devices having OTP memory failures).

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments.

While the exemplary embodiments of the present invention have been described with respect to processing blocks in a software program, including possible implementation as a digital signal processor, micro-controller, or general purpose computer, the present invention is not so limited. As would be apparent to one skilled in the art, various functions of software may also be implemented as processes of circuits. Such circuits may be employed in, for example, a single integrated circuit, a multi-chip module, a single card, or a multi-card circuit pack.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention. Similarly, although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports may be referred to by the same name and are interchangeable for purposes here.

It will be further understood that various changes in the details, materials, and arrangements of the parts which have been described and illustrated in order to explain the nature of this invention may be made by those skilled in the art without departing from the scope of the invention as expressed in the following claims.

I claim:

1. A method of providing encryption/decryption of data transferred between a media controller and a storage device, wherein the media controller providing said encryption/decryption based on a root key (RK), the method comprising:
   providing storage in a one-time programmable (OTP) memory as a plurality of un-burned slots to store data, the OTP memory initially provided without the RK;
   generating, with a random number generator, the RK;
   performing, with a control module, the steps of i) burning the RK to an initial slot of the OTP memory, and ii) validating the burned RK (bRK) stored at the initial slot based on a comparison of the RK and the burned RK;
   wherein, when the control module validates the burned RK:
      employing the burned RK as the RK by the media controller to provide said encryption/decryption;
   otherwise:
   burning one or more subsequent slots with the RK and validating each corresponding bRK until the control module validates the corresponding burned RK, and then employing the burned RK as the RK by the media controller to provide said encryption/decryption;
   wherein the comparison of the RK and the burned RK (bRK) is based on a maximum threshold of changed bits; and
   wherein a number of changed bits between RK and the bRK is determined by an exclusive-or (XOR) operation.

2. The method of claim 1, further comprising:
   burning a checksum (cbRK) of the burned RK to the corresponding slot of OTP memory.

3. The method of claim 1, further comprising:
   if the control module validates the burned RK:
      employing the burned RK as the RK by the media controller to provide said encryption/decryption;
   otherwise:
      burning one or more subsequent slots with the RK and validating each corresponding bRK until either i) the control module validates the corresponding burned RK, and then employing the burned RK as the RK by the media controller to provide said encryption/decryption, or ii) all slots of the OTP memory are used.

4. The method of claim 2, further comprising:
   comparing, by a comparator, the checksum of the burned RK (cbRK) and a value, read from the OTP memory, of the checksum of the burned RK (rcbRK);
   wherein, if the cbRK and the rcbRK are substantially equal:
      employing the burned RK as the RK by the media controller to provide said encryption/decryption;
   otherwise:
   burning one or more subsequent slots with the RK and validating each corresponding bRK until the control module validates the corresponding burned RK, and then employing the burned RK as the RK by the media controller to provide said encryption/decryption.

5. A non-transitory machine-readable storage medium, having encoded thereon program code, wherein, when the program code is executed by a machine, the machine implements a method of providing encryption/decryption of data transferred between a media controller and a storage device, wherein the media controller providing said encryption/decryption based on a root key (RK), the method comprising:
   providing storage in a one-time programmable (OTP) memory as a plurality of un-burned slots to store data, the OTP memory initially provided without the RK;
   generating, with a random number generator, the RK;
   performing, with a control module, the steps of i) burning the RK to an initial slot of the OTP memory, and ii) validating the burned RK (bRK) stored at the initial slot based on a comparison of the RK and the burned RK;
   wherein, when the control module validates the burned RK:
      employing the burned RK as the RK by the media controller to provide said encryption/decryption;
   otherwise:
   burning one or more subsequent slots with the RK and validating each corresponding bRK until the control module validates the corresponding burned RK, and then employing the burned RK as the RK by the media controller to provide said encryption/decryption;
   wherein the comparison of the RK and the burned RK (bRK) is based on a maximum threshold of changed bits; and
   wherein a number of changed bits between RK and the bRK is determined by an exclusive-or (XOR) operation.

6. The computer readable medium of claim 5, further comprising:
   burning a checksum (cbRK) of the burned RK to the corresponding slot of OTP memory.

7. The computer readable medium of claim 5, further comprising:
   if the control module validates the burned RK:
      employing the burned RK as the RK by the media controller to provide said encryption/decryption;
   otherwise:
      burning one or more subsequent slots with the RK and validating each corresponding bRK until either i) the control module validates the corresponding burned RK, and then employing the burned RK as the RK by the media controller to provide said encryption/decryption, or ii) all slots of the OTP memory are used.

8. The computer readable medium of claim 6, further comprising:
comparing, by a comparator, the checksum of the burned RK (cbRK) and a value, read from the OTP memory, of the checksum of the burned RK (rcbRK);
wherein, if the cbRK and the rcbRK are substantially equal:
employing the burned RK as the RK by the media controller to provide said encryption/decryption;
otherwise:
burning one or more subsequent slots with the RK and validating each corresponding bRK until the control module validates the corresponding burned RK, and then employing the burned RK as the RK by the media controller to provide said encryption/decryption.

9. An apparatus comprising a media controller configured to provide encryption/decryption of data transferred between the media controller and a storage device, wherein the media controller provides said encryption/decryption based on a root key (RK), the apparatus comprising:
a one-time programmable (OTP) memory having a plurality of un-burned slots to store data, wherein the OTP memory is initially provided without the RK;
a random number generator configured to generate the RK;
a control module configured to i) burn the RK to an initial slot of the OTP memory, and ii) validate the burned RK (bRK) stored at the initial slot based on a comparison of the RK and the burned RK,
wherein, when the control module validates the burned RK:
the burned RK is employed as the RK by the media controller to provide said encryption/decryption;
otherwise:
the control module is configured to burn one or more subsequent slots with the RK and validate each corresponding bRK until the control module validates the corresponding burned RK, the burned RK employed as the RK by the media controller to provide said encryption/decryption; wherein the comparison of the RK and the burned RK (bRK) is based on a maximum threshold of changed bits; and wherein a number of changed bits between RK and the bRK is determined by an exclusive-or (XOR) operation.

10. The apparatus of claim 9, wherein the control module is adapted to burn a checksum (cbRK) of the burned RK to the corresponding slot of OTP memory.

11. The apparatus of claim 9, wherein the control module is configured to burn one or more subsequent slots with the RK and validate each corresponding bRK until either i) the control module validates the corresponding burned RK, and then employing the burned RK as the RK by the media controller to provide said encryption/decryption, or ii) all slots of the OTP memory are used.

12. The apparatus of claim 9, wherein the comparator is adapted to compare a checksum of the burned RK (cbRK) and a value, read from the OTP memory, of the checksum of the burned RK (rcbRK), wherein
if the cbRK and the rcbRK are substantially equal, the burned RK is employed as the RK by the media controller to provide said encryption/decryption;
otherwise:
one or more subsequent slots are burned with the RK until the control module validates the corresponding burned RK, and then employing the burned RK as the RK by the media controller to provide said encryption/decryption.

13. The apparatus of claim 9, wherein the apparatus is implemented in a monolithic integrated circuit chip.

* * * * *